UNITED STATES PATENT OFFICE 2,530,630

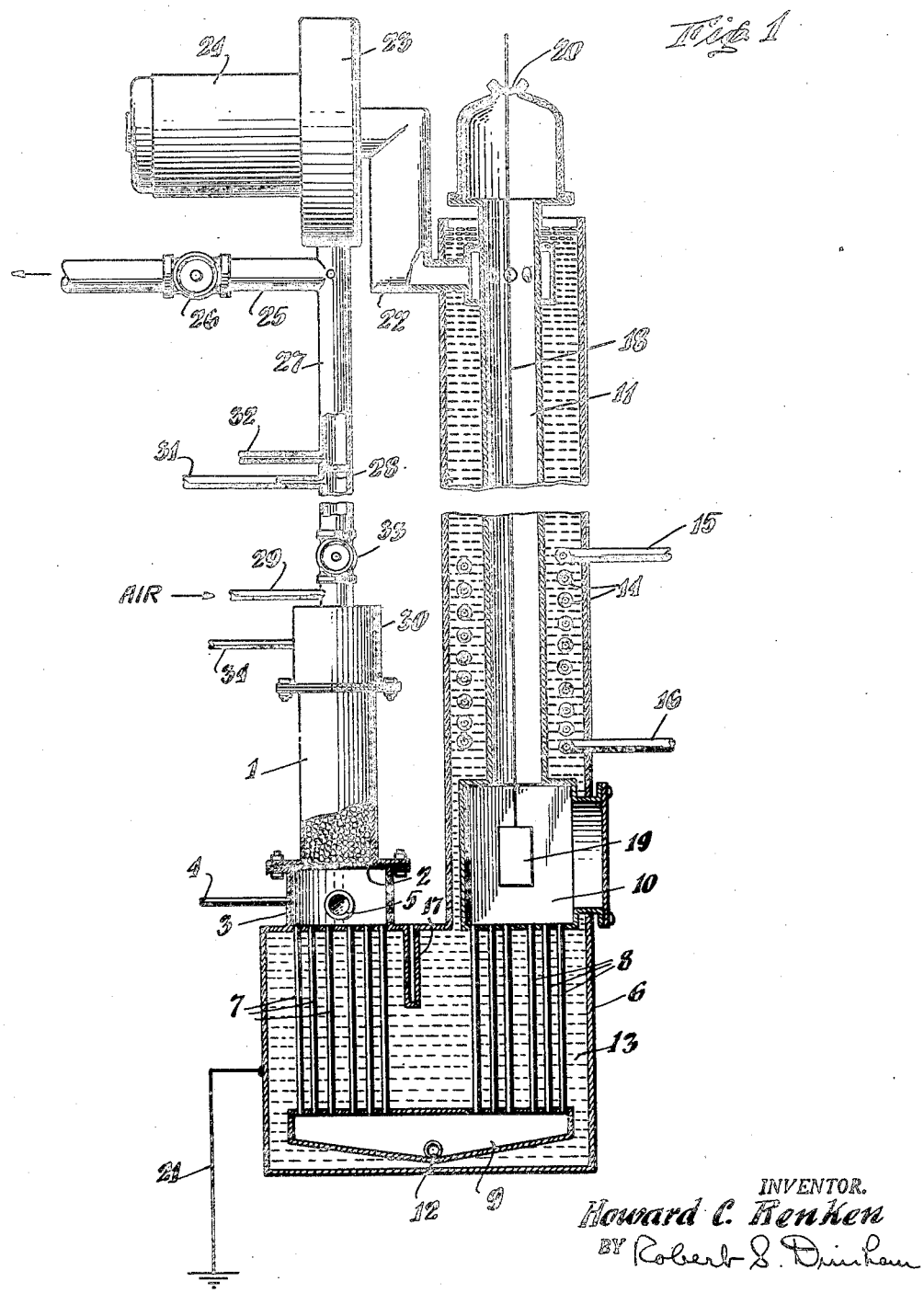

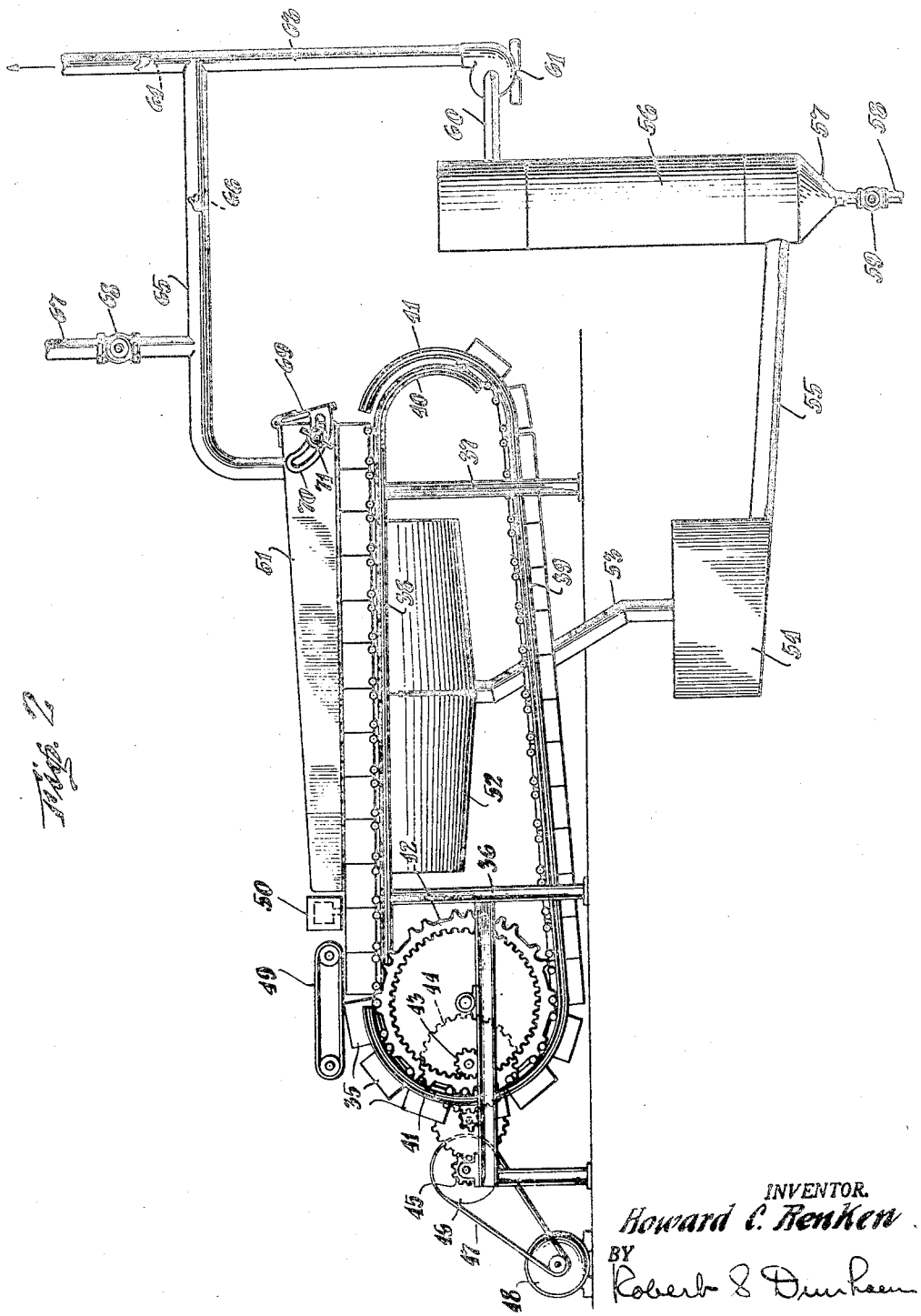

PROCESS OF RECOVERING SULFUR FROM PYRITE

Howard C. Renken, Columbus, Ohio, assignor, by mesne assignments, to Noranda Mines, Limited, Toronto, Ontario, Canada, a corporation of Ontario Application October 7, 1947, Serial No. 778,403

2 Claims. (Cl. 23—226)

The present invention relates to a process for the recovery of sulphur from pyrite and particularly from pyrite fines. More particularly, the present invention relates to such a process of the type wherein a part of the pyrite is burned to generate heat for the distillation of the sulfur, also as to effect a maximum recovery of sulfur while keeping the cost of the process down to a minimum. The process is particularly adapted to the treatment of pyrite fines, which are obtained incident to the recovery of other minerals with which the pyrite occurs in nature.

It has been known for some time that one sulfur atom from pyrite may be distilled off by a heat decomposition according to the following reaction:

(1) $\qquad FeS_2 + heat = FeS + S$

It is also well known that the heat required to carry on the above reaction can be obtained by burning the residual iron monosulfide according to the reaction:

(2) $\qquad 3FeS + 5O_2 = Fe_3O_4 + 3SO_2 + heat$

Furthermore the possibility that iron monosulfide (FeS) will react with sulfur dioxide ($SO_2$) to produce sulfur and iron oxide has been recognized. This reaction probably proceeds as follows:

(3) $\qquad 3FeS + 2SO_2 = Fe_3O_4 + 5S$

The prior art has made various attempts to carry out these several reactions or some of them, but no commercial application of any such process is heretofore known.

Among the difficulties which have been experienced in attempting to carry out this general process is the fact that unreacted oxygen, in excess of that required for or which escapes from reaction (2) above, tends to combine with and oxidize the sulfur liberated according to reaction (1), thereby reducing the yield of elemental sulfur. The prior art has attempted to overcome this difficulty by supplying some other fuel, for example by mixing coal or coke with the pyrite, so as to take up the excess oxygen and so as to provide an adequate supply of heat for the process. Other attempts of the prior art to secure the same general results have involved the segregation of the reactions by conducting the several stages of the process in different apparatus or vessels so, for example, to effect a distillation in one place or container by heat which is produced to a large extent in another place or in another container. These attempts have involved the use of more or less complicated equipment, which is subject to substantial deterioration due to the corrosive character of the gases being handled.

The mechanical problem of moving the charge and the products through a reaction chamber has also not been solved heretofore. Difficulty has arisen, for example, from the fact that the temperature required for reaction to proceed at a reasonable rate is so high that the iron sulfide product of this reaction tends to become a semi-fused sticky mass. Various alternatives have been proposed to solve this problem, including the provision of very large reaction chambers and the conducting of the process at a relatively low temperature and correspondingly slow rate. Other proposed solutions have included the complete fusing of the solid residue, which required additional fuel from outside sources and complicated means for handling the materials, particularly the highly corrosive molten residue. In general, the prior art processes have been complicated and expensive with the result, from a commercial point of view, that the processes have been useless in view of the poor yield coupled with the relatively low price or value of the resulting products.

A primary object of the present invention is to provide a simple, cheap and reliable process for handling material of this kind and for producing therefrom a maximum amount of sulfur with a minimum cost of operation of the process considered both from the point of view of fuel and power requirements, and also from the point of view of the first cost and maintenance cost of the equipment used.

A further and more detailed object of the present invention is to provide a process as aforesaid for producing sulfur and also any other normally solid and volatile product which may occur with pyrite, such as selenium, by a distillation reaction as aforesaid. During this process the mass of pyrite particles may be maintained stationary or bodily moved; but there is no relative movement of such particles. The present process may be carried out either intermittently as a batch process or substantially continuously by the use of apparatus as hereinafter set forth.

A further and detailed object of the present invention is to provide for the control of the intensity of the reaction as to a mass of pyrite as aforesaid, so as to prevent undue and undesired fusing of the mass and to prevent excessive oxidation of the desired products, while using the pyrite itself as the sole fuel for supplying the heat required for the process. This may be effected by diluting the air used to sustain some combustion with some inert non-oxidizing gas or gaseous coolant, which may be either recirculated gases from the present process or some non-oxidizing gas from an external source, or both.

Other and more detailed objects of the present invention will become apparent in the following specification and appended claims, when considered in connection with the accompanying drawings in which:

Figure 1 is a view principally in elevation but with parts broken away and in vertical section illustrating a relatively small scale apparatus for carrying out the process of the present invention on a batch basis; and Fig. 2 is a view partly in elevation and partly diagrammatic, illustrating a sintering machine and associated equipment by which the present process may be carried out on a commercial scale.

The present invention in general contemplates the heating of a mass of pyrite by the direct combustion of a part of this mass, the passing of heat and the hot products of combustion from the portion thereof which is burning through the remainder of the mass and the consequent distillation from the remainder of the mass of volatile materials, particularly sulfur. This process thus is operative without the use of any fuel from external sources and is consequently economical in its requirements for fuel. In order that the reaction be controlled, so that too large a percentage of the combustible materials be kept from burning to the oxide forms and thus consuming an undesired amount of the sulfur in the original pyrite and in order to prevent undesired fusion of the residue, the intensity of the reaction is carefully controlled by controlling the proportion of oxygen in the gas supplied to the mass and thereby controlling the reaction. This may be effected either on an intermittent batch process basis, as shown in Fig. 1, or on a continuous basis, as shown in Fig. 2.

Turning now to the Fig. 1 form of the invention, which illustrates a laboratory model which has been successfully operated in the practice of the present invention, there is shown a charge cylinder 1, which may be of steel and in the model above referred to was about 5 inches in diameter and about 12 inches tall. The lower end of the cylinder is provided with a screen grate 2, which is held in place between the cooperating flanges of the cylinder 1 and supporting casing 3. A manometer connection 4 may be provided for ascertaining the pressure of the gases within the casing 3. This casing may also be provided with a suitably covered peep hole 5 as shown. Below the casing 3 there is shown a condenser structure 6, which may be formed as a part of the casing 3 or as a separate part. This condenser is provided with two sets of condenser tubes 7 and 8 connected serially to a header 9 at their lower ends. The upper ends of the tubes 7 communicate with the interior of the casing 3, while the upper ends of the tubes 8 communicate with a chamber 10. In this chamber and in a cylindrical space 11 above and communicating therewith provision is made for precipitating out of the gases any solid particles or liquid droplets still remaining in and carried along mechanically by the gases at this point. A suitable drain 12 may be provided communicating with the header 9 for the removal of condensate. The sets of tubes 7 and 8 and the header 9 are enclosed in a temperature controlling bath as an oil bath 13 within the casing 6, the oil of this bath also surrounding the passage 11 extending vertically upward from the chamber 10. Suitable means, such as a cooling coil 14, having inlet and outlet passages 15 and 16, may be provided for controlling the temperature of the oil of the bath 13. The temperature of the oil bath may be ascertained by a conventional thermometer (not shown) inserted in a thermometer well 17.

Electrical precipitation means are preferably provided including a straight wire electrode 18 carrying a suitable weight 19 and suspended from a power lead which passes through a cover member 20 at its upper end and a ground lead 21 connected to any suitable grounded portion of the apparatus, as well as the usual power supply means (not shown).

Gases drawn from the space 11 may pass through a suitable connecting passage means 22 to a suction fan 23 which may be operated by any suitable source of power as a motor 24. If desired, the passage means 22 may be provided with suitable filtering means, such as a mass of steel wool, to prevent sulfur particles which may remain in the gases from passing to the fan. A part of the gases from the fan 23 are passed from the system through a passage 25 under control of a valve 26 to some suitable point or place at which they may be used, otherwise treated and/or disposed of. Such further use or disposition forms no part of the present invention but may, for example, include the use of the sulfur dioxide in the gases for any purpose for which this gas may be employed, for example, the making of sulfuric acid.

A complementary portion of the gases is passed through a line 27 and through a metering orifice 28 therein to mix with incoming air from a line 29 in a chamber 30 and then to be fed to the charge cylinder 1. Suitable manometer connections, as indicated at 31 and 32, may be provided communicating with the line 27 on opposite sides of the orifice 28 for determining the amount or rate of flow of the recirculated gases. This amount may further be controlled by a valve 33 disposed in this line. Another manometer connection 34 may be provided in association with the mixing chamber 30 for ascertaining the pressure of the mixed gases in this chamber.

While it is contemplated that the present invention and particularly the apparatus illustrated in Fig. 1 described above as to construction may be used with pyrite in lump form, it is also contemplated that the process may be applied to the recovery of values, particularly sulfur, from pyrite fines such as are available from certain operations used in the treatment of ores for the recovery of other valuable mineral constituents. For example, such other pyrite fines may be obtained as a flotation concentrate. When using material of this kind, it is practically necessary first to nodulize it in order that the fine particles be reasonably pervious to the passage of gases in accordance with the present invention and to prevent the undesired agglomeration of the mass. If ordinary pyrite in lump form is being used, it is preferable to reduce it by suitable crushing operations to about ⅜ inch size particles. When fines are being treated, they may be suitably nodulized into nodules of any desired form and size which will be reasonably pervious to gases and which will be sufficiently strong so as to make up a bed or mass which will not agglomerate down to a gas-impervious condition. The details of this nodulizing operation form no part of the present invention. Any desired and available apparatus and/or process may be used for forming such nodules. It is presently deemed preferable that the nodules be from about ⅛ inch to about ¼ inch in diameter. This not only prevents the pyrite from forming a gas-impervious bed, but also prevents the fine particles of pyrite from being blown away by the flow of gases therethrough. It is usually found desirable to have the nodules of pyrite fairly dry prior to the distillation operation herein described. This step is normally done by drying the pyrite subsequent to the nodulizing of the material. One reason for the drying step is that if too wet nodules were used, the vaporized sulfur from the upper layer during the initial portion of the process on any batch would tend to condense on the wet underlayer portions thereof, which is undesired.

When operating the apparatus shown in Fig. 1, the charge was first ignited on the surface, by applying a gas flame to the charge surface, while drawing a small volume of air through the bed or mass. Following the ignition, the parts were assembled in the position shown and the air and return gas adjusted to the desired ratio, which in this case involved the use of about 3½ cu. ft. per minute of air and about 4 cu. ft. per minute of returned gas. This amount of incoming gases was used in the treatment of about 7 kilograms of original charge for a period of time of about 40 minutes. The oil temperature in the oil bath 13 was maintained at about 130° C., which caused the condensation of substantially all the sulfur distilled from the charge. The sulfur thus recovered was from about 35% to 40% of that originally contained in the pyrite, and being from 70% to 80% of the labile sulfur. The solid residue remaining after the operation was complete contained about 18% sulfur and weighed about 70% as much as the original charge.

From the operation of this test apparatus it was learned that the best guide for controlling the proportions of the blast mixture for optimum operation conditions was the appearance and other physical characteristics of the solid residue following the completion of the operation upon a batch. The character of the residue preferred was one that contained many small pores but few large voids or blow holes. It should also be friable and easily removable from the container. In one test in which this desired type of residue was obtained, the maximum temperatures attained by a thermocouple imbedded in the charge was 1070° C.

It is contemplated that the process from a commercial point of view may be operated using apparatus such as is shown, for example, in Fig. 2. In this figure a plurality of containers 35 are arranged to be moved successively along a closed or endless path. The containers 35 are preferably made up in a suitable manner with gas-pervious bottoms in the form of grates or screens. Suitable means including structural supporting members 36 and 37, guide rails 38, 39, and curved end guide members 40, 41 are provided as shown for supporting and retaining the containers 35 in their path of movement.

While it may be possible in accordance with the present invention to arrange the containers 35 as an endless carrier by connecting them together, the arrangement disclosed in Fig. 2 is one in which they are not so connected, but in which they are arranged for movement as shown on the guides 38 to 41, the containers in the upper path of their movement being supported on the guide rails 38 and being pushed along by the engagement of one container with another. Return of the containers to the left hand end of the apparatus as shown in Fig. 2 is secured by arranging the lower guide rails 39 inclined downwardly from right to left. The containers could be arranged to pass around one or more idler sprockets at the right hand end of the apparatus, or as shown may be guided from their upper to their lower run by curved guides 40 and 41. The containers are each provided with suitable wheels or rolls, which are arranged not only to support the containers, but also for engagement with the curved guides 40 and 41 at the right and with one or more driving sprockets as shown at 42 at the left in this figure. The driving sprockets move the containers in engagement therewith positively; and these in turn move those in front of them on the upper path of the travel of the containers by engagement of one container with the one in front of it. Suitable means are provided for driving the sprockets 42. For this purpose, each of the sprockets 42 may be provided with internal gear teeth meshing with a drive pinion 43, which is rigid on a shaft with a gear 44. This gear may be driven through a suitable speed-reducing gear train as shown from a pinion 45, which is carried upon a shaft rigid with a suitable pulley 46, driven through a belt 47 from a prime mover here indicated as a motor 48.

The charge of pyrite, which may be either lumps of pyrite crushed to a desired size or nodulized pyrite, both as aforesaid, may be supplied to the containers 35 from a suitable source (not shown) through a short belt conveyor generally indicated at 49. Alternatively any other suitable means may be used, preferably substantially continuous in character, for supplying the lump or nodulized pyrite to the containers 35 to build up in each container a bed of pyrite which will be of substantial depth, such as 12 inches.

The upper run of the path of the containers 35 is intended for their movement from left to right, as seen in Fig. 2, passing near the sprockets 42 beneath the feeding device here diagrammatically illustrated by the conveyor 49, then passing under suitable ignition means shown as a hood 50, to which a combustible gas may be supplied, which gas is burned so as to ignite the surface of each bed of pyrite as it passes under this hood. The containers 35 are then passed beneath a muffle hood 51 through which the gaseous combustion-supporting mixture as hereinafter described is supplied to the containers 35. Beneath the path of the containers and in position to receive gases passing therethrough is a windbox 52, which is connected by a pipe or duct 53 to a cooling chamber or condenser 54. The latter chamber is connected through a duct 55 to the lower end of an electrostatic precipitator 56, such as a Cottrell precipitator, the pipe 55 being downwardly inclined and passing from the lower portion of the cooling chamber or condenser 54, so that both liquid and gases will pass through the duct 55, to the lower end of the precipitator 56. This lower end is formed as a condensate receiving means 57 and is provided with an outlet passage 58 under control of a valve 59. The upper end portion of precipitator 56 is connected through a suitable pipe or duct 60 to a suction fan 61, by which the system from the windbox 52 to the suction fan is kept under a predetermined sub-atmospheric pressure.

The outlet duct from the fan 6 is shown at 63 and passes to a suitable point where a part of the gases may be used, this part being controlled by a suitable valve 64. The use of these gases may be as above stated for the gases passing out through the pipe 25 in the Fig. 1 form of the invention. A branch pipe 65 is provided, flow through which may be controlled by a suitable valve 66 for controlling the proportion or amount of gases recirculated in accordance with the present invention.

In some instances it may be desired to discharge all the gases from the blower 61 out of the system through the outlet duct 63 by maintaining the valve 64 open and the valve 66 closed. Under these circumstances and in order to afford a control of the intensity of reaction in the containers 35, it may be desired to dilute the air supplied to the containers with some inert, non-combustion-supporting gas. For this purpose a pipe 67 is shown to which such an inert gas of any suitable kind and from any suitable source may be supplied, the control of such gas being effected by a valve 68 in the pipe 67.

Means are also provided, preferably in conjunction with the muffle hood 51 for controlling the admission of air thereto, so as, in conjunction with the control of the inert gas supplied to this hood, to control the proportion of oxygen in the gases supplied to the containers 35 for supporting the reaction therein. For this purpose any suitable means may be provided, such for example as a door 69 associated with an opening to the hood 51, which door may be adjusted as to position. Such adjustment may be suitably secured as by a sector member 70 secured to the door 69 and arranged to be fixed with respect to the hood by a thumb screw 71.

The operation of the apparatus of Fig. 2 will be essentially the same in principle as that of Fig. 1, which has been described in detail, with the exception that the containers are being bodily moved during the progress of the reaction. The apparatus shown in the drawings is intended to be diagrammatic in character as an apparatus of any desired length could be used to provide, in conjunction with the adjusted speed of travel of the containers 35, a desired time period for the reaction as to each charge. It will further be noted that while the containers 35 are bodily moved, there is no relative movement between the particles or lumps of pyrite incident to the operation of the process itself. Any fusion which may take place is not undesirable. The entire reaction and the rate of combustion are under accurate control by controlling the proportion of recirculated gases or added inert gases, or both, which have little or no oxygen therein, to mix with the incoming air. Some incipient or controlled fusion, or sintering, is contemplated in accordance with the present invention. In this way the amount of oxygen supplied to each burning mass may be effectively regulated to be such that it will control the intensity of the reaction to a desired point, so as to achieve optimum results.

It will be understood that the solid residue may be suitably cleaned out of the containers 35 during their lower or return run and that when they are again presented beneath the feeding equipment 49, they will be in readiness to receive a new charge.

In addition to elemental sulfur, other valuable products may be obtained by any known process from the products produced according to the present invention. One of these is a high-grade sulfur-dioxide bearing gas, which may be treated further for the recovery of sulfur dioxide, or for the production of either sulfur or sulfuric acid. Another product is the partially desulfurized sinter which is well suited for further processing in a manner forming no part of the present invention for the recovery of iron and/or other metals which may be found with the raw material being treated. Another material which is sometimes found with pyrite is arsenic, which, due to its volatilee character, may be vaporized at the same time the sulfur is vaporized and may be cooled and condensed with the sulfur. This material may be separated from the sulfur and used in any desired manner which forms no part of the present invention.

It will be understood that any suitable temperature controlling means, not shown in detail, may be associated with the cooling means 54 so as to control the temperature of the gases passing therethrough and so that the exit temperature of these gases will be reduced to a desired point, such, for example, as 130° C.

While the embodiments of the invention shown in Figs. 1 and 2 and particularly described hereinabove both show the passage of the gases downwardly through a mass of pyrite, what is basically important to the process is that the gases be passed in some predetermined direction through such a mass. This direction might, for example, be upwardly or laterally or even at some angle to the horizontal or vertical. It is, of course, necessary that the mass of pyrite be ignited on what will be the upstream direction considered from the point of view of the flow of gases, i. e. that surface of the mass directed toward the direction from which the gases are passed to and through the mass. When this process is thus conducted, whether the mass be held stationary or bodily moved, the desirable results hereinabove set forth will be attained.

While there is illustrated herein but two types of apparatus, one a batch type apparatus actually constructed and operated on a laboratory scale, and the other a substantially continuously operating apparatus, the present process may be carried out with other types of equipment. I do not wish to be limited, therefore, except by the scope of the appended claims, which are to be construed validly, as broadly as the state of the prior art permits.

What is claimed is:

1. The process of recovering sulfur from pyrite fines, which comprises the steps of nodulizing the fines to form nodules of predetermined size and physical characteristics, placing a mass of said nodules upon a gas-pervious support in a bed of substantial depth, igniting the upper surface of the mass while maintaining the mass on said support without substantial relative movement of the nodules thereof, admitting some air to the upper surface of the mass to maintain combustion thereof while passing gases downwardly through and away from the burning mass, cooling the gases from the burning mass sufficiently to condense out sulfur therefrom, and diverting a selected part only of the remaining gases from the condensation step, mixing such gases with a predetermined amount of incoming air and recycling such mixed gases through the burning mass, so as to control the reaction.

2. The process of continuously recovering sulfur from pyrite fines, which comprises the steps of nodulizing the fines to form nodules of about ⅛ inch to ¼ inch in size, continuously supplying the nodules thus formed to a plurality of receptacles of a continuous sintering machine, maintaining masses of nodules with an average depth of about one foot upon gas-pervious supports in said sintering machine without substantial relative movement of the nodules during the sintering operation, continuously moving the supports with the masses of nodulized pyrite thereon, igniting the upper surfaces of each of the masses upon the respective supports at one zone in the path of movement of said supports, admitting some air to the upper surfaces of the masses of nodulized pyrite at a further zone so as to support combustion of some of the pyrite, drawing gases downwardly through the masses of pyrite on said supports, cooling and collecting the resulting gases to condense out normally solid materials including sulfur, using a part of the remaining gases following the condensation step aforesaid to mix with and dilute the air supplied to support combustion, so as to control the reaction, and controlling the proportion of the gases so mixed with the incoming air in accordance with the physical characteristics of the solid residue remaining on said supports following the combustion operation.

HOWARD C. RENKEN.

REFERENCES CITED

The following references are of record in the file of this patent:

UNITED STATES PATENTS

| Number | Name | Date |
|---|---|---|
| 882,517 | Dwight et al. | Mar. 17, 1908 |
| 1,083,252 | Hall | Dec. 30, 1915 |
| 1,215,636 | Dwight | Feb. 13, 1917 |
| 1,789,460 | Clark | Jan. 20, 1931 |
| 1,941,592 | Bacon et al. | Jan. 2, 1934 |
| 1,971,815 | Halvorsen | Aug. 28, 1934 |
| 1,976,736 | Kuzell | Oct. 16, 1934 |
| 2,044,960 | Tyrer | June 23, 1936 |
| 2,058,480 | McCallum et al. | Oct. 27, 1936 |